US008203939B2

(12) United States Patent
Noel et al.

(10) Patent No.: US 8,203,939 B2
(45) Date of Patent: Jun. 19, 2012

(54) METHOD AND APPARATUS FOR PROVIDING A WINDOW BASED OVERLOAD CONTROL

(75) Inventors: Eric Noel, Holmdel, NJ (US); Carolyn Roche Johnson, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 228 days.

(21) Appl. No.: 12/558,506

(22) Filed: Sep. 12, 2009

(65) Prior Publication Data

US 2011/0063974 A1 Mar. 17, 2011

(51) Int. Cl.
*H04L 12/26* (2006.01)
(52) U.S. Cl. .......................... 370/229; 370/252; 709/232
(58) Field of Classification Search .................. 370/392, 370/252, 253, 225, 465, 401, 235, 445, 338, 370/236, 221, 254
See application file for complete search history.

(56) References Cited

U.S. PATENT DOCUMENTS

| | | | | |
|---|---|---|---|---|
| 7,490,151 B2 * | 2/2009 | Munger et al. | ................ | 709/225 |
| 7,535,913 B2 * | 5/2009 | Minami et al. | ................ | 370/401 |
| 7,609,640 B2 * | 10/2009 | Ahuja et al. | ................ | 370/236 |
| 7,672,247 B2 * | 3/2010 | Gonzalez et al. | ............. | 370/252 |
| 7,684,332 B2 * | 3/2010 | Ray et al. | ...................... | 370/235 |
| 7,760,755 B2 * | 7/2010 | Ginzburg et al. | ............. | 370/445 |
| 2005/0286440 A1 * | 12/2005 | Strutt et al. | .................... | 370/253 |
| 2006/0092888 A1 * | 5/2006 | Jeong et al. | ................... | 370/338 |
| 2008/0062863 A1 * | 3/2008 | Ginde | .......................... | 370/221 |
| 2008/0117907 A1 * | 5/2008 | Hein | ............................ | 370/392 |
| 2009/0028135 A1 * | 1/2009 | Mantripragada et al. | ..... | 370/352 |
| 2009/0316719 A1 * | 12/2009 | Baron et al. | ................. | 370/465 |
| 2010/0008259 A1 * | 1/2010 | Yoon et al. | .................... | 370/254 |

\* cited by examiner

*Primary Examiner* — Steven H Nguyen

(57) ABSTRACT

A method and apparatus for controlling a network load in a packet network are disclosed. For example, the method receives a request from a User Agent Client (UAC), and sends the request to a core proxy server. The method receives a request from a User Agent Client (UAC) and sends the request to a core proxy server. The method increments a counter, if the request is positively acknowledged by the core proxy server. The method decrements a value for a window size parameter by a first predetermined value, and resets the counter, if the request is not positively acknowledged by the core proxy server, and the method decrements a number of outstanding requests if the request is positively acknowledged or negatively acknowledged.

20 Claims, 4 Drawing Sheets

METHOD AND APPARATUS FOR PROVIDING A WINDOW BASED OVERLOAD CONTROL

The present invention relates generally to communication networks and, more particularly, to a method and apparatus for controlling a network load in packet networks, e.g., Internet Protocol (IP) networks, Voice over Internet Protocol (VoIP) networks, Virtual Private Networks (VPN), wireless networks, and the like.

BACKGROUND OF THE INVENTION

A network, e.g., a Voice over Internet Protocol (VoIP) network, is traditionally optimized to handle a load during busy hour traffic while subject to some level of congestion and/or failure of network elements within a network. However, it is not engineered to account for extremely large traffic surges caused by exception events.

When a surge in demand beyond the engineered capacity of the network occurs, the network operator or service provider may simply limit the traffic to the core network to prevent the network from failing. However, this has the unintended effect of limiting the carried load before the network reaches the maximum capacity that it is capable of supporting. Furthermore, the network operator's revenue may be based on the carried load. Hence, limiting the carried load prior to reaching the maximum capacity may also affect the network operator's revenue.

SUMMARY OF THE INVENTION

In one embodiment, the present invention discloses a method and apparatus for controlling a network load in a packet network. For example, the method receives a request from a User Agent Client (UAC), and sends the request to a core proxy server. The method receives a request from a User Agent Client (UAC) and sends the request to a core proxy server. The method increments a counter, if the request is positively acknowledged by the core proxy server. The method decrements a value for a window size parameter by a first predetermined value, and resets the counter, if the request is not positively acknowledged by the core proxy server, and the method decrements a number of outstanding requests if the request is positively acknowledged or negatively acknowledged.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for controlling a network load. Although the present invention is discussed below in the context of networks that use Session Initiation Protocol (SIP), the present invention is not so limited. Namely, the present invention can be applied for networks using other signaling protocols.

Capacity of telephony networks is traditionally optimized to handle load during busy hour traffic while subject to some level of congestions and/or failures of network elements within a network. However, it is not engineered to account for extremely large traffic surges caused by exception events, such as the sudden increase in call volumes experienced after a major disaster, during contests of a highly popular television show in which viewers can participate by voting via telephony endpoint devices, or following an advertisement campaign after which a large number of customers may call to a particular number within a short period of time. To cope with such exception events, operators may rely on traditional network management capabilities to handle the sudden increase in traffic load effectively. However, in new and emerging packet based network, such as SIP based servers within IP networks, there are new challenges to be addressed. For example, the SIP protocol introduces new messages and requires a larger number of messages per call than in traditional telephony networks. In addition, routing within SIP networks often involves multiple routing choices to elements that can have varying capacities. SIP servers need to be able to protect against traffic surges while maximizing throughput during traffic overload.

Figure 1:
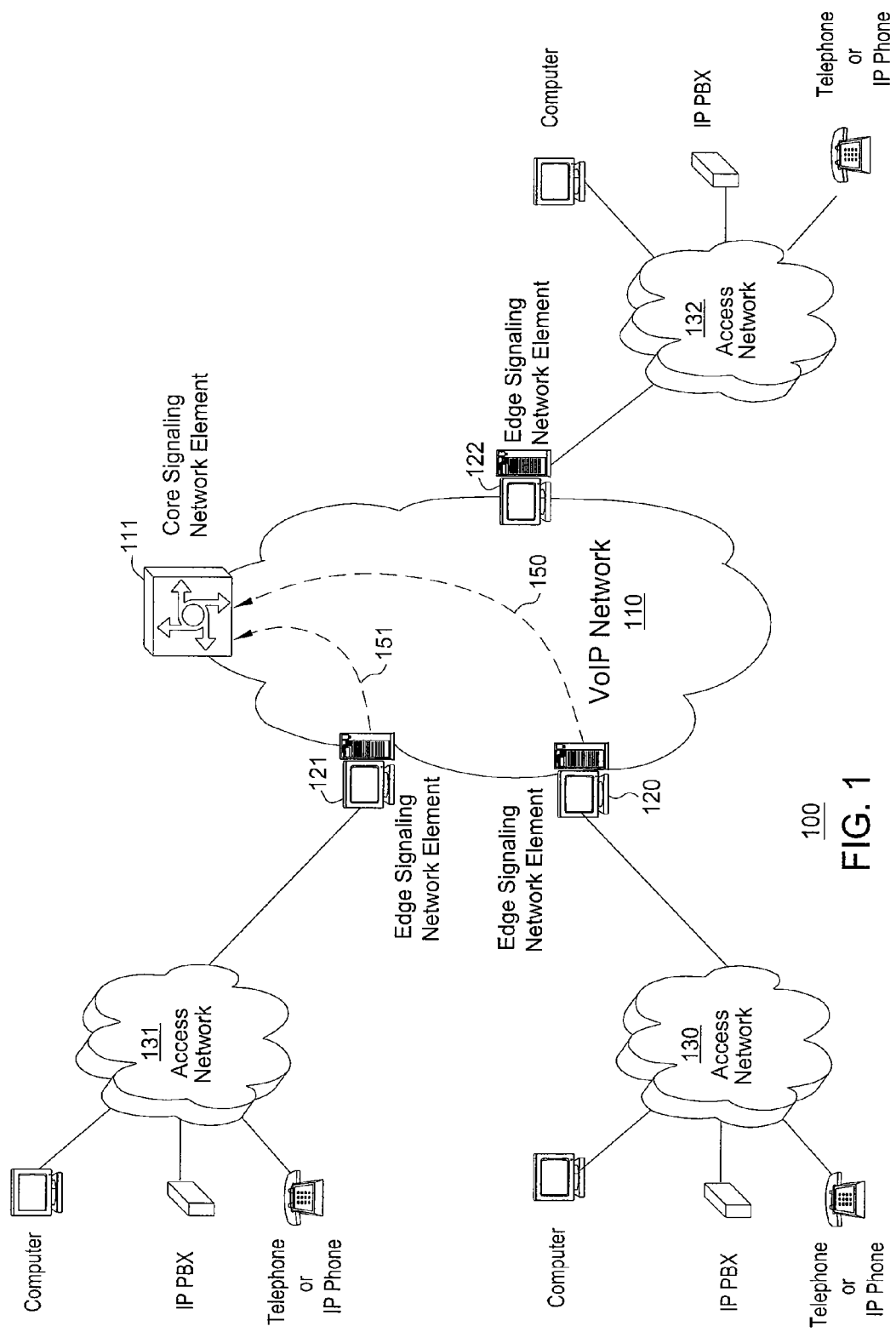
FIG. 1 illustrates an exemplary network related to the present invention.

To address this criticality, the present invention enables edge network elements to perform overload controls. FIG. 1 illustrates an illustrative packet network 100, e.g., a VoIP network, related to the present invention. Alternatively, packet network 100 may be implemented as an Internet Protocol Multimedia Subsystem (IMS) network. IMS is an architectural framework for delivering Internet Protocol (IP) multimedia to mobile users defined by the standard body, 3rd Generation Partnership Project (3GPP). In FIG. 1, three edge signaling network elements 120, 121, and 122 (e.g., routers, switches, gateways, and the like) are deployed at the edge of VoIP network 110 interconnecting access networks 130, 131, and 132, respectively. Core signaling network element 111 is interconnected with edge signaling network elements 120, 121, and 122 via the VoIP network 110. In general, a plurality of core signaling network elements and a plurality of edge signaling networks can exist in VoIP network 110.

Note that examples of an edge signaling network element include a Media Gateway or a Session Border Controller that performs signaling, media control, security, and call admission control and related functions for calls originated from an access network and to be processed by a core signaling network element. The core signaling network element resides within the packet core infrastructure and communicates with the edge signaling network elements using e.g., the Session Initiation Protocol (SIP) over IP within the underlying VoIP network 110.

The core signaling network element 111 can be implemented for example as a Media Gateway Controller, a Softswitch, an Application Server, a core router or switch, or a Call Session Control Function (CSCF) in an IMS network and performs network wide call control related functions.

SIP is an illustrative signaling protocol used between signaling network elements, and is discussed here to illustrate a signaling communications network. Broadly defined, SIP is an Internet Engineering Task Force (IETF) signaling protocol standard for creating, modifying, and terminating call sessions. These sessions include, but are not limited to, internet telephone calls, multimedia distributions, and multimedia conferences, etc. SIP invitations (e.g., used to create sessions)

carry session descriptions that allow entities to agree on a set of compatible media types. SIP makes use of network elements called proxy servers to help route call requests, authenticate and authorize users for services, implement provider call-routing policies, and provide features to users. In FIG. 1, in one embodiment, edge signaling network elements 120, 121, and 122 are edge proxies and core signaling network element 111 is a core proxy according to the SIP protocol standard.

In one example, during an exception event in which a large volume of calls are placed by callers destined to access network 132, edge signaling network elements 120 and 121 may process call requests originating from access networks 130 and 131 and forward the requests to the core signaling network element 111 for further processing using flows 150 and 151, respectively. If the total call volume far exceeds the processing capacity of the core signaling network element 111, core signaling network element 111 can become so congested that it results in a catastrophic failure in which no calls can be processed at all. In this case, call requests destined to edge signaling network element 122 will not be processed by core signaling network element 111 for call completion to access network 132.

When a surge in demand beyond the engineered capacity of the network occurs, in order to prevent the network from failing, the network operator may simply limit the amount of traffic to the core network well below the engineered capacity. This process is sometimes referred to as throttling back. For example, the network operator may instruct the SIP proxies located at the edge of the network to limit traffic directed to the core network proxies. However, this approach has the unintended effect of limiting the carried load before the network reaches the maximum capacity that it is able to support. For example, the throttling may leave a significant percentage of the network capacity unused while calls are being denied. Furthermore, the network operator's revenue is generally based on the carried load. Hence, limiting the carried load prior to reaching the maximum capacity may also adversely affect the network operator's revenue.

In one embodiment, the current method provides control of a network load by using an overload control method that is based on a windowing scheme. To better understand the current invention, the following networking terminology will first be provided:

SIP user agent (UA);
User Agent Client (UAC); and
User Agent Server (UAS).

A SIP user agent (UA) is a logical network end-point used to create or receive SIP messages to manage a SIP session. A SIP UA may perform the role of a User Agent Client (UAC) or the role of a User Agent Server (UAS) as defined below. These roles of UAC and UAS last only for the duration of a SIP transaction.

A User Agent Client (UAC) is a SIP term for an entity that performs client functionality. For example, a UAC generates SIP requests which are to be serviced by a User Agent Server (UAS).

A User Agent Server (UAS) is a SIP term for an entity that receives SIP requests and returns a SIP response.

In one embodiment, the current method controls the network load by increasing and decreasing window size (Ws) using a counter mechanism. Ws is also referred to as the value of a window size parameter. For example, the method may be implemented in an edge proxy to protect a core proxy by controlling the network load using counters. It should be noted that each edge proxy employs an instance of the present window control. For example, if there are ten (10) edge proxies in a network, then each of the 10 edge proxies will execute its own instance of the present window control method independently. The method has the added advantage that the control algorithm operates without the need for explicit message exchange between the edge and core proxies, or between different edge proxies. Furthermore, if there are multiple core proxies, then each edge proxy must maintain a plurality of instances of the present window control method, i.e., one instance for each of the core proxies.

In one embodiment, when an edge proxy of the current invention receives an INVITE message from a UAC, the method first determines if the SIP INVITE message is an initial SIP INVITE message or a retransmission of a previously sent SIP INVITE message. If the message is a retransmission of a previously sent SIP INVITE message, the method forwards the INVITE message to the core proxy without incrementing the number of outstanding SIP INVITE messages, e.g., tracked by a counter.

If the SIP INVITE message is an initial SIP INVITE message, the edge proxy forwards the message to the core proxy if and only if the number of outstanding SIP INVITE messages, Wo, is strictly less than the value of a window size parameter, Ws. Otherwise, the edge proxy notifies the UAC that the call is rejected. If the SIP INVITE message is an initial SIP INVITE message and Wo is less than Ws, the edge proxy forwards the INVITE message to the core proxy and increments the number of outstanding SIP INVITE messages, Wo, by one. That is, if the SIP INVITE message that is sent to the core proxy is a retransmission of a previously sent SIP INVITE message, then Wo is not incremented, but if the message is an initial message, then Wo is incremented.

In sum, the window size parameter, Ws, is used by the edge proxy to determine whether a SIP INVITE message is to be forwarded to the core proxy for handling. More importantly, the window size parameter, Ws, is dynamically adjusted, e.g., up or down.

In one embodiment, the value of a window size parameter, Ws, is bounded by a minimum value (e.g., 0.5) for the window size, Wmin, and a maximum value (e.g., 100) for the window size, Wmax. That is, the window size, Ws, satisfies the inequality Wmin≦Ws≦Wmax. In one embodiment, when the window size Ws is increased, it is increased by a predetermined value, W+, that is configured for incrementing Ws. Similarly, when the window size, Ws, is decreased, it is decreased by a predetermined value, W−, configured for decreasing Ws. In one embodiment, the network operator selectively configures the values for W+ and W−.

In one embodiment, the method also maintains a positive acknowledgement counter C. In one embodiment, the positive acknowledgement counter is subject to an upper bound Cmax (e.g., 2). Specifically, C≦Cmax. More specifically, each time a SIP INVITE message is positively acknowledged by a core proxy server, the positive acknowledgement counter C, maintained by the edge proxy, is incremented by one. Each time a SIP INVITE is either rejected by the core proxy or times out, the positive acknowledgement counter C is reset to zero and the window size, Ws, is reduced by the predetermined value for window size decrementing W−. For example, if a SIP INVITE message forwarded by the edge proxy to the core proxy times out, C is set to zero and the value of Ws is set to the previous value of Ws minus W− (e.g., new value of Ws=previous value of Ws minus W−). If C reaches the upper bound Cmax, then the window size, Ws, is incremented by W+, and C is reset to zero.

In sum, if the upper bound Cmax is reached without experiencing a rejection or a time-out event, then the present method presumes that it is safe to increment Ws by a predefined amount, i.e., increasing the amount of SIP INVITE messages that the edge proxy is allowed to send to the core proxy. In contrast, when a rejection or a time-out event occurs, then the present method presumes that an overload condition is likely present and the present invention will decrement Ws by a predefined amount, i.e., decreasing the amount of SIP INVITE messages that the edge proxy is allowed to send to the core proxy.

Note that since the method allows for real numbered window sizes, it is possible to have a non-zero window size. For example, the values of W+ and W− may be set as 0.1 and 0.5, respectively, resulting in a window size, Ws, that has a fractional value. In one embodiment, when such conditions occur, the method will treat the fractional value by allowing one additional call to be processed. For example, a Ws value of 100.5 will indicate that the 101th SIP INVITE message is forwarded with a probability of 0.5.

In one embodiment, the present method is biased to favor reducing the window size. That is, the values of W+ and W− are set such that W+ is less than W−. This has the effect of increasing the window size slowly while allowing the window size to be decreased quickly when calls are rejected. For example, if a network disaster occurs, the edge proxy will be able to react quickly to protect the core proxy. When the network failure clears, the edge proxy then increases the window size gradually (i.e., slowly).

Figure 2:
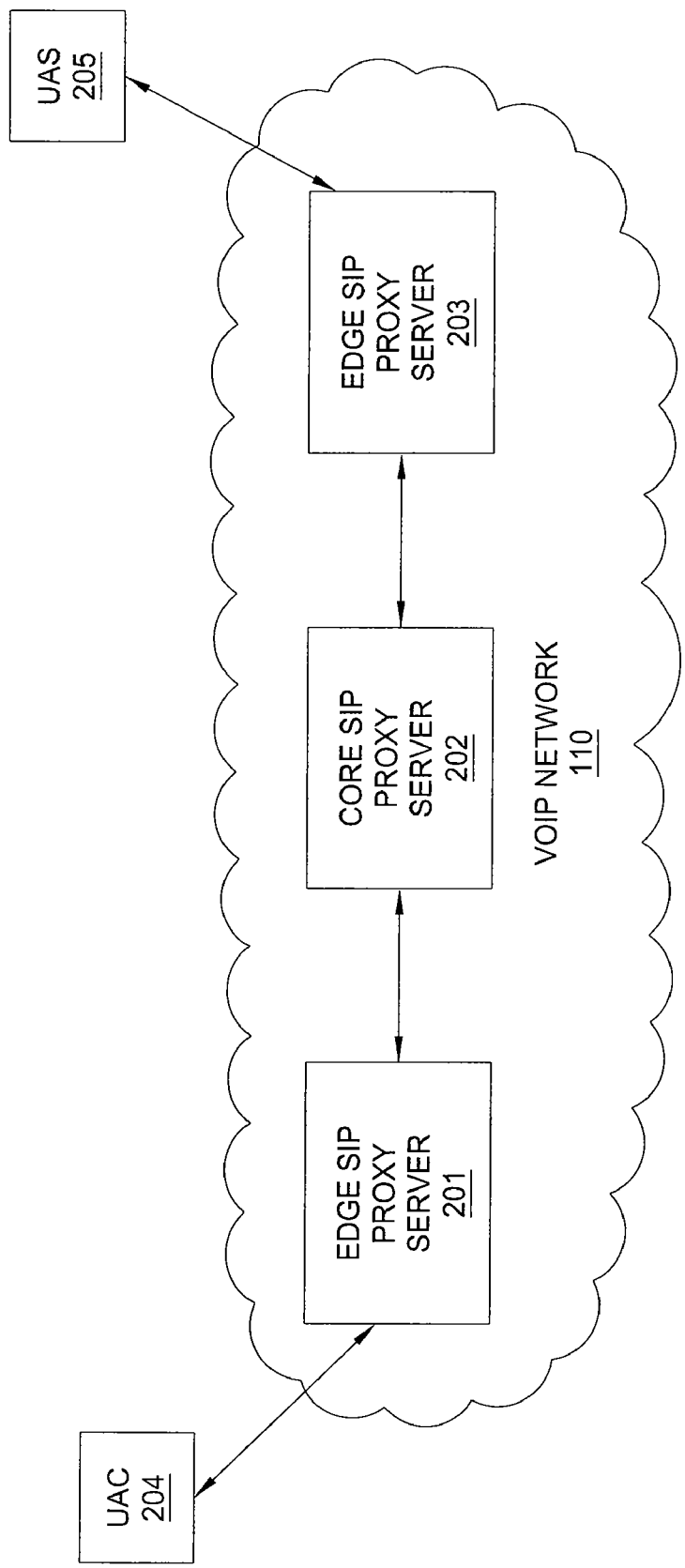
FIG. 2 illustrates an exemplary network with the current invention for controlling a network load.

FIG. 2 illustrates an exemplary network 200 of the current invention for controlling a network load. Edge SIP proxy servers 201 and 203 communicate with the core SIP proxy server 202 in VoIP network 110. It should be noted that any number of edge SIP proxy servers and core SIP proxy servers can be deployed in the VoIP network 110. In other words, the edge SIP proxy functionality is implemented in the edge signaling network elements 201 and 203 and the core SIP proxy functionality is implemented in the core signaling network element 202.

In one embodiment, the UAC 204 (e.g., any one of the endpoint devices shown in FIG. 1, or network elements within the access networks) originates a SIP INVITE message (e.g., destined for UAS 205 via edge SIP proxy server 203) towards the core SIP proxy server 202 via the edge SIP proxy server 201. The edge SIP proxy server 201 receives the SIP INVITE message from the UAC 204 and determines if the request is an initial request or a retransmission of a previous request. If the request is a retransmission request, then the edge SIP proxy server 201 forwards the request to the core SIP proxy server 202, without incrementing the number of outstanding SIP INVITE messages, Wo. If the request is an initial request, then the edge SIP proxy server 201 determines if the number of outstanding SIP INVITE messages, Wo, is less than Ws. If Wo is less than Ws, then the edge SIP proxy server 201 will forward the SIP INVITE message to the core SIP proxy server 202 and increments Wo by one. Otherwise, the edge SIP proxy server 201 rejects the request. For example, edge SIP proxy server 201 sends a rejection to the UAC 204, thereby indicating that the edge SIP proxy server has reached the limit of allowable outstanding SIP INVITE messages that are currently being processed.

The edge SIP proxy server 201 monitors to determine if a reply is received for requests that have been forwarded to the core SIP proxy server 202. The SIP INVITE may be positively acknowledged, rejected or timeout (no response).

If a positive acknowledgement is received, the edge proxy server increments the counter for positive acknowledgement (C) and decrements the number of outstanding requests (Wo). It should be noted that Wo cannot be decremented below the value of 0. If C reaches the upper bound Cmax, then the window size, Ws, is incremented by W+, and C is reset to zero.

If the SIP INVITE message is either rejected by the core proxy 202 or times out without a response, the edge SIP proxy server 201 resets the counter for positive acknowledgement (C) to zero, reduces the window size by W− and decrements the number of outstanding requests (Wo). For example, if a SIP INVITE message is forwarded by the edge SIP proxy server to the core SIP proxy server and no response is received, then C is set to zero and Ws is set to a new value by subtracting W− from the previous value of Ws.

Figure 3:
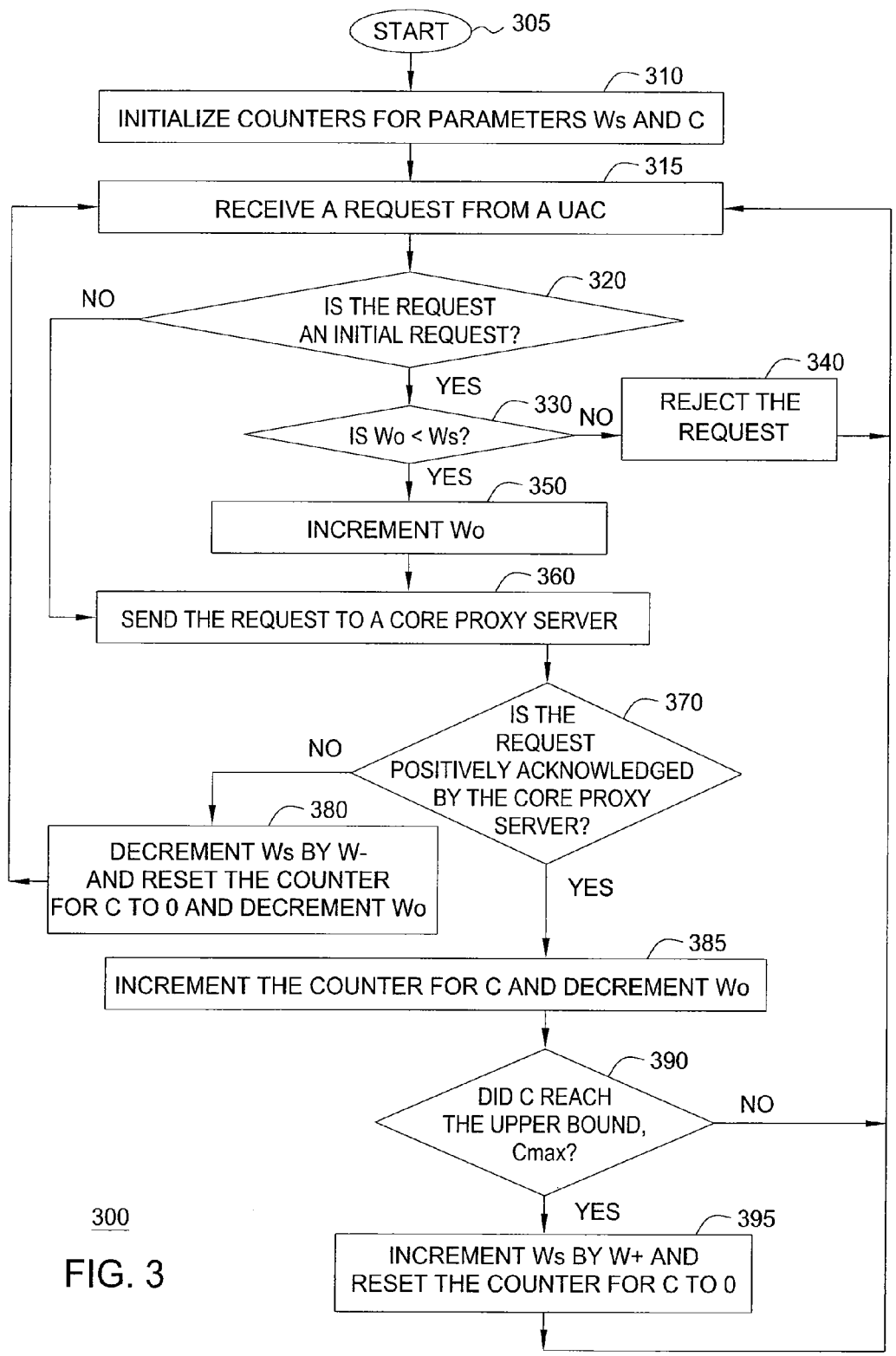
FIG. 3 illustrates a flowchart of a method for controlling a network load.

FIG. 3 illustrates a flowchart of a method 300 for controlling a network load. For example, method 300 can be employed by an edge SIP proxy server. Method 300 starts in step 305 and proceeds to step 310.

In step 310, method 300 initializes various values, e.g., a value for a window size parameter and a counter for positive acknowledgements. For example, the method may set the value of Ws to Wmax and C to zero. The method then proceeds to step 315.

In step 315, method 300 receives a request from a User Agent Client (UAC). For example, an edge network element may receive an INVITE message directed towards a core network element. In one embodiment, the INVITE message is sent using a signaling protocol, e.g., using Session Initiation Protocol (SIP). For example, the INVITE message may be a SIP INVITE message. However, the present invention can be adapted to any other signaling protocols.

In step 320, method 300 determines if the request is an initial request. For example, a request may be a retransmission of a previously received request or a new request. If the request is an initial request, then the method proceeds to step 330. Otherwise, the method proceeds to step 360.

In step 330, method 300 determines if the number of outstanding requests sent to a core proxy server is less than the value of a window size parameter. For example, the method determines whether the number of SIP INVITE messages sent to the core proxy server that are still outstanding is less than Ws. If the number of outstanding requests sent to a core proxy server is less than Ws, then the method proceeds to step 350. Otherwise, the method proceeds to step 340.

In step 350, method 300 increments the number of outstanding requests (Wo). For example, if the number of outstanding requests sent to the core proxy server has a value of x, then the value is incremented to x+1.

In step 340, method 300 rejects the request. For example, the method may send a response to the UAC rejecting the SIP INVITE message.

In step 360, method 300 sends the request to the core proxy server. It should be noted that for the purpose of the present disclosure, "sending the request by the edge proxy server to the core proxy server" broadly encompasses the embodiment where the same SIP INVITE message received by the edge proxy server is simply forwarded to the core proxy server, and the embodiment where the "first" SIP INVITE message received by the edge proxy server causes the edge proxy server to generate a "second" SIP INVITE message that corresponds to the "first" SIP INVITE message to be forwarded to the core proxy server. In other words, the "first" request may be a SIP INVITE received by an edge proxy server from the UAC. The edge proxy server may then send the "second" SIP INVITE message to the core proxy server on behalf of the UAC.

In step 370, method 300 determines if the request is positively acknowledged by the core proxy server. For example, the method may receive a response to the SIP INVITE message positively acknowledging the SIP INVITE message. If the request is positively acknowledged by the core proxy server, the method proceeds to step 385. Otherwise, the method proceeds to step 380.

In step 380, method 300 decrements the value of the window size by a predetermined value, resets the counter for positive acknowledgements, and decrements the number of outstanding requests (Wo). For example, the above SIP INVITE message may simply time out or be rejected by the core proxy server. The method then reduces the value of the window size, Ws, by W− and resets the counter for positive acknowledgement to zero. The method then returns to step 315 to continue receiving requests.

In step 385, method 300 increments the counter for positive acknowledgements and decrements the number of outstanding requests (Wo). For example, if a positive acknowledgement is received from the core proxy server, the edge proxy server increments the counter for positive acknowledgements by one.

In step 390, method 300 determines if the counter for positive acknowledgements has reached an upper bound. For example, the number of positive acknowledgements may have reached an upper bound Cmax. If the counter for positive acknowledgements has reached an upper bound, then the method proceeds to step 395. Otherwise, the method proceeds to step 315 to continue receiving requests.

In step 395, method 300 increments the value of a window size parameter, Ws, by a predetermined value, and resets the counter for positive acknowledgements to zero. For example, the method may set Ws to a new value determined by adding the previous value of Ws and W+. The method also sets the value of C to zero. The method then proceeds to step 315 to continue receiving requests.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step. Furthermore, one or more steps of method 300 can be deemed to be optional steps depending on the requirements of a particular implementation. Furthermore, any specific values disclosed above for various parameters are only illustrative and should not be deemed as a limitation of the present invention.

Figure 4:
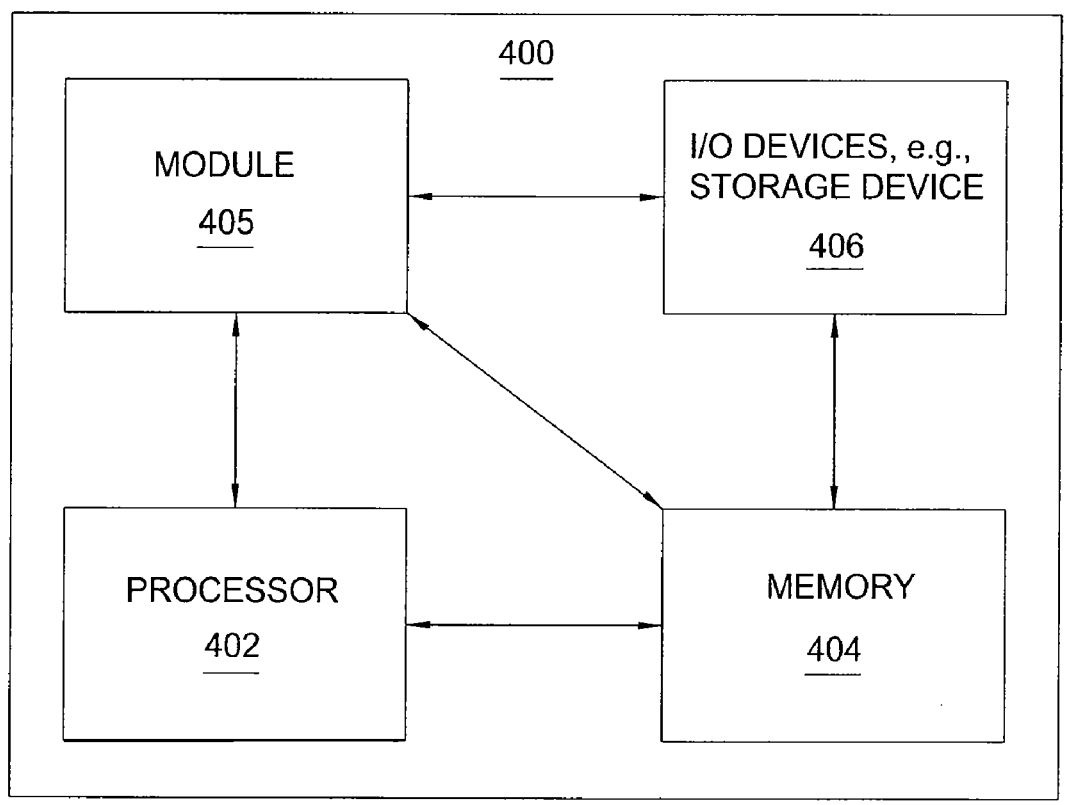
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for controlling a network load, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for controlling a network load can be loaded into memory 404 and executed by processor 402 to implement the functions as discussed above. As such, the present method 405 for controlling a network load (including associated data structures) of the present invention can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for controlling a network load at an edge proxy server, comprising:
receiving a request from a user agent client;
sending the request to a core proxy server;
incrementing a counter, if the request is positively acknowledged by the core proxy server;
decrementing a value for a window size parameter by a first predetermined value, and resetting the counter, if the request is not positively acknowledged by the core proxy server; and
decrementing a number of outstanding requests, if the request is positively acknowledged or negatively acknowledged.

2. The method of claim 1, further comprising:
determining if the counter has reached an upper bound; and
incrementing the value for the window size parameter by a second predetermined value, and resetting the counter to zero, if the counter has reached the upper bound.

3. The method of claim 1, further comprising:
determining if the request is an initial request; and
determining if the number of outstanding requests sent to the core proxy server is less than the value for the window size parameter, if the request is an initial request.

4. The method of claim 3, further comprising:
rejecting the request, if the number of outstanding requests sent to the core proxy server is not less than the value for the window size parameter.

5. The method of claim 3, further comprising:
incrementing the number of outstanding requests sent to the core proxy server by one, if the number of outstanding requests sent to the core proxy server is less than the value for the window size parameter.

6. The method of claim 1, wherein the value of the window size parameter is bounded by a minimum value and a maximum value.

7. The method of claim 2, wherein the first predetermined value is less than the second predetermined value.

8. A non-transitory computer-readable storage medium having stored thereon a plurality of instructions, the plurality of instructions including instructions which, when executed by a processor, cause the processor to perform a method for controlling a network load at an edge proxy server, comprising:
receiving a request from a user agent client;
sending the request to a core proxy server;
incrementing a counter, if the request is positively acknowledged by the core proxy server;
decrementing a value for a window size parameter by a first predetermined value, and resetting the counter, if the request is not positively acknowledged by the core proxy server; and decrementing a number of outstanding requests, if the request is positively acknowledged or negatively acknowledged.

9. The non-transitory computer-readable storage medium of claim 8, further comprising:
determining if the counter has reached an upper bound; and
incrementing the value for the window size parameter by a second predetermined value, and resetting the counter to zero, if the counter has reached the upper bound.

10. The non-transitory computer-readable storage medium of claim 8, further comprising:
determining if the request is an initial request; and
determining if the number of outstanding requests sent to the core proxy server is less than the value for the window size parameter, if the request is an initial request.

11. The non-transitory computer-readable storage medium of claim 10, further comprising:
rejecting the request, if the number of outstanding requests sent to the core proxy server is not less than the value for the window size parameter.

12. The non-transitory computer-readable storage medium of claim 10, further comprising:
incrementing the number of outstanding requests sent to the core proxy server by one, if the number of outstanding requests sent to the core proxy server is less than the value for the window size parameter.

13. The non-transitory computer-readable storage medium of claim 8, wherein the value of the window size parameter is bounded by a minimum value and a maximum value.

14. The non-transitory computer-readable storage medium of claim 9, wherein the first predetermined value is less than the second predetermined value.

15. An apparatus for controlling a network load, comprising:
a processor; and
a computer-readable medium in communication with the processor, the computer-readable medium having stored thereon a plurality of instructions, the plurality of instructions including instructions which, when executed by the processor, cause the processor to perform a method comprising:
receiving a request from a user agent client;
sending the request to a core proxy server;
incrementing a counter, if the request is positively acknowledged by the core proxy server;
decrementing a value for a window size parameter by a first predetermined value, and resetting the counter, if the request is not positively acknowledged by the core proxy server; and
decrementing a number of outstanding requests, if the request is positively acknowledged or negatively acknowledged.

16. The apparatus of claim 15, wherein the method further comprises:
determining if the counter has reached an upper bound; and
incrementing the value for the window size parameter by a second predetermined value, and resetting the counter to zero, if the counter has reached the upper bound.

17. The apparatus of claim 15, wherein the method further comprises:
determining if the request is an initial request; and
determining if the number of outstanding requests sent to the core proxy server is less than the value for the window size parameter, if the request is an initial request.

18. The apparatus of claim 17, wherein the method further comprises:
rejecting the request, if the number of outstanding requests sent to the core proxy server is not less than the value for the window size parameter.

19. The apparatus of claim 17, wherein the method further comprises:
incrementing the number of outstanding requests sent to the core proxy server by one, if the number of outstanding requests sent to the core proxy server is less than the value for the window size parameter.

20. The apparatus of claim 16, wherein the first predetermined value is less than the second predetermined value.

* * * * *